US005892615A

United States Patent [19]
Grubb et al.

[11] Patent Number: 5,892,615
[45] Date of Patent: Apr. 6, 1999

[54] OUTPUT POWER ENHANCEMENT IN OPTICAL FIBER LASERS

[75] Inventors: Stephen G. Grubb; Raymond Zanoni; Robert G. Waarts, all of Fremont, Calif.; Jean-Luc Archambault, Savage, Md.

[73] Assignee: SDL, Inc., San Jose, Calif.

[21] Appl. No.: 819,689

[22] Filed: Mar. 17, 1997

[51] Int. Cl.$^6$ .............................. G02B 6/26; H01S 3/30; H01C 3/06

[52] U.S. Cl. .................... 359/341; 359/337; 385/126; 385/127

[58] Field of Search ..................... 359/134, 160, 359/334, 337, 341; 385/1, 28, 30, 32, 126, 127

[56] References Cited

U.S. PATENT DOCUMENTS

| | | |
|---|---|---|
| 4,697,869 | 10/1987 | So et al. . |
| 4,721,351 | 1/1988 | Goepfert et al. . |
| 5,216,728 | 6/1993 | Charlton et al. . |
| 5,218,665 | 6/1993 | Grasso et al. . |
| 5,323,404 | 6/1994 | Grubb . |
| 5,355,483 | 10/1994 | Serlet . |
| 5,363,234 | 11/1994 | Newhouse et al. ...................... 359/341 |
| 5,450,427 | 9/1995 | Fermann et al. . |
| 5,473,622 | 12/1995 | Grubb ......................................... 372/6 |
| 5,485,480 | 1/1996 | Kleinerman ................................ 372/6 |
| 5,560,003 | 9/1996 | Nilsen et al. . |
| 5,579,153 | 11/1996 | Laming et al. .......................... 359/341 |
| 5,627,848 | 5/1997 | Fermann et al. ......................... 372/102 |
| 5,636,046 | 6/1997 | Ishikawa et al. ......................... 359/160 |

FOREIGN PATENT DOCUMENTS

| | | |
|---|---|---|
| 2531545 | 2/1984 | France . |
| 2667697 | 4/1992 | France . |
| 2166257 | 4/1986 | United Kingdom . |

OTHER PUBLICATIONS

Minelly et al, IEEE Photonics Tech. Letters, vol. 5, #3, pp. 301–303, Mar. 1993; Abstract only herewith.
Chen et al, Proc. 1996 Conf. Lasers & Electro–optics Europe, Sep. 13, 1996, p. 299 ct hL3 (abst. only).
*Journal of Lightwave Technology*, vol II, No. 9, pp. 1435–1446, Sep. 1993, High–Power Double–Clad Fiber Lasers, by Luis Zenteno.
*If Memory Serves*, Hands On Some Assembly Required, by Rick Grehan, Aug. 1989, pp. 279, 280, 282, 284 and 286.

(List continued on next page.)

*Primary Examiner*—Nelson Moskowitz
*Attorney, Agent, or Firm*—Kudirka & Jobse, LLP

[57] ABSTRACT

An optical fiber used as the active amplifying medium in a fiber laser is arranged to have a high insertion loss at an undesired frequency, while retaining a low insertion loss at a desired lasing frequency. In one embodiment, loss at a Raman-shifted frequency is introduced by using an optical fiber which has multiple claddings with an index profile that includes an elevated index region located away from the core, but within the evanescent coupling region of the core. A distributed loss, which can be enhanced by bending, is produced at the Raman frequency which effectively raises the threshold at which Raman scattering occurs in the fiber and therefore results in a frequency-selective fiber. In another embodiment, an absorbing layer is placed around the core region. The absorbing layer is chosen to have a sharp absorption edge so that it absorbs highly at the Raman-shifted wavelength, but minimally at the desired lasing wavelength. In still another embodiment, the optical fiber is constructed with a core with long period gratings formed therein. The gratings are fabricated with a periodicity selected to provide a relatively high insertion loss at the Raman frequency while simultaneously providing a relatively low insertion loss at the lasing frequency. In accordance with yet another embodiment, a bend loss technique is used to suppress amplified spontaneous emission at an unwanted wavelength due to a competing atomic energy level system in a fiber laser.

16 Claims, 5 Drawing Sheets

OTHER PUBLICATIONS

*Virtually Virtual Memory*, Hands On Some Assembly Required, by Rick Grehan, Sep. 1990, pp. 455, 456, 458, 460, 462 and 464.

*Evaluation of Parallel Copying Garbage Collection on a Shared–Memory Multiprocessor*, by Akira Imai et al., IEEE Transactions on Parallel and Distributed Systems, vol. 4, No. 9, Sep. 1993, pp. 1030–1040.

*On Multi–Threaded List–Processing and Garbage Collection*, by Wolfgang W. Kuechlin et al., Department of Computer and Information Science, The Ohio State University, Jan. 1991, pp. 894–897.

*HeapGuard™, Eliminating Garbage Collection in Real–Time Ada Systems*, Sam Harbaugh et al., Integrated Software, Inc., pp. 704–708.

*Windows*, Windows' Invisible Wall: The 64K Barrier, by Ed Bott, Mar. 1994, pp. 210–212.

*Garbage Collection for Prolog Based on WAM*, Communications of the ACM, vol. 31, issue 6, by Karen et al., Dec. 4, 1996, pp. 1–20.

OUTPUT POWER ENHANCEMENT IN OPTICAL FIBER LASERS

STATEMENT REGARDING FEDERALLY SPONSORED RESEARCH OR DEVELOPMENT

This invention was made with U.S. Government support under Contract Number N61331-93-C-0061 awarded by ARPA. The government has certain rights in the invention.

FIELD OF THE INVENTION

This invention relates generally to fiber lasers and, more particularly, to high-power fiber lasers.

BACKGROUND OF THE INVENTION

Diode lasers are often used to pump erbium single-mode fiber amplifiers; however, a single diode laser typically generates only a relatively small amount of pumping power. Consequently, an array of diode lasers, or a laser bar, is conventionally used to generate a pump power level which is relatively large when compared with the pump power level provided by a single diode laser. The output beam produced by an array of laser diodes is highly multi-mode and thus not suitable for launching directly into a single mode fiber core. Therefore, in order to effectively couple a diode laser array to a single mode fiber core, a technique commonly referred to as "cladding pumping" is used. In a cladding pump technique, a single-mode core is surrounded by a multi-mode cladding layer which, in turn, is surrounded by an outermost cladding layer. A relatively high-power multimode pumping signal launched into the cladding from a diode array is substantially confined and guided within the multi-mode cladding layer. As the pumping energy propagates along the multi-mode cladding layer criss-crossing the doped fiber core, the energy is absorbed by the single-mode core. The absorbed multi-mode power is converted into a single-mode laser emission within the core. For many applications, this is an effective technique for supplying a relatively high-power pumping signal to a single-mode fiber laser.

However, one factor which limits the output power characteristic of a cladding pumped fiber laser is the conversion of a portion of the laser output signal from the desired lasing frequency to an unwanted so-called "Raman frequency." This conversion occurs by a process known as stimulated Raman scattering which shifts the desired output frequency to the first Stokes frequency of the fiber core. In optical fibers manufactured from silica, the first Stokes frequency corresponds to a wavelength of approximately 450 $cm^{-1}$ or about 60 nanometers (nm) in the region of 1100 nm. Raman scattering is power-related and becomes significant when power levels increase above a threshold. The power limitation imposed by Raman scattering is more severe in pulsed fiber laser systems. With the effective area of typical cladding-pumped fibers and fiber lengths of about 50 meters, Raman scattering becomes significant at output power levels typically in the range of a few tens of watts. When Raman shifting occurs, the shifted wavelengths are also amplified in the laser oscillator thereby diverting the pumping energy also to the Raman-shifted wavelength output. Output at the desired lasing wavelength is therefore effectively limited.

A similar problem occurs when the laser gain at a desired lasing wavelength is less than the laser gain at another wavelength. In this case, amplified spontaneous emission (ASE) may occur at the other wavelength and prevent the laser from operating at the desired wavelength or require an increase in the pumping intensity in order to generate a desired power output. For example, it may be desirable to operate a neodymium (Nd) fiber laser comprised of a Nd-doped double clad fiber at a laser wavelength of 940 nm. However, neodynium is a three-level system at 940 nm and the amplifier gain of the fiber is usually higher at 1060 nm where Nd is a four-level system. Consequently, operation at a wavelength of 940 nm requires a relatively high pump intensity due to the presence of the competing energy level system.

It is therefore desirable to control the output power characteristics of cladding pumped fiber lasers.

It is further desirable to suppress unwanted wavelengths in cladding pumped fiber lasers.

It is further desirable to reduce the effective pumping of a shifted wavelength output due to Raman scattering.

SUMMARY OF THE INVENTION

In accordance with the present invention, the optical fiber employed as the active amplifying medium in a fiber laser is arranged to have a high insertion loss at the undesired frequency, while retaining a low insertion loss at the desired lasing frequency. In one embodiment, loss at an undesired frequency is introduced by using an optical fiber which has multiple claddings with an index profile which may include an elevated index region located in close spatial proximity to the core, specifically, within the evanescent coupling region of the core. This raised index section produces a distributed loss at the undesired frequency which is several orders of magnitude higher than the loss in an unmodified fiber, but no, or minimal, loss is introduced at the desired lasing frequency. This approach effectively raises the threshold at which, for example, Raman scattering occurs in the fiber and, therefore, results in a frequency-selective fiber. When such a fiber is used as the active medium in a laser, the output power can be considerably higher before Raman shifting occurs.

In another embodiment, an absorbing layer is placed around the core region. The absorbing layer is chosen to have a sharp absorption edge so that it absorbs highly at the undesired wavelength, but minimally at the desired lasing wavelength. Such a structure also produces a fiber with a distributed loss at the undesired wavelength.

In still another embodiment, the optical fiber is constructed with a core with long period gratings formed therein. The gratings are fabricated with a periodicity selected to provide a relatively high insertion loss at the undesired frequency while simultaneously providing a relatively low insertion loss at the lasing frequency. The long period gratings act as discrete loss elements to undesired wavelength signals propagating in the optical fiber. In some applications, it may be preferable to construct the fiber core with a region having a plurality of long period gratings formed along the fiber length. This approach can be realized in conventional optical fibers by conventional doping techniques.

In accordance with yet another embodiment, a bend loss technique is used to suppress the undesired wavelengths. For example, bending loss can be used to suppress amplified spontaneous emission (ASE) at an unwanted, longer wavelength due to a competing atomic energy level system in a fiber laser. The technique includes continuously bending the fiber with a selected bend radius and pumping the fiber with a pump signal. When the bend radius is selected properly, light at the unwanted wavelength radiates out of the core. The gain of the fiber at the unwanted wavelength is inhibited to prevent the occurrence of ASE at the unwanted wavelength, allowing the fiber to operate as a laser in the desired lasing wavelength.

BRIEF DESCRIPTION OF THE DRAWING

The foregoing features of the invention, as well as the invention itself may be more fully understood from the following detailed description of the drawings, in which.

DETAILED DESCRIPTION OF PREFERRED EMBODIMENTS

Figure 1:
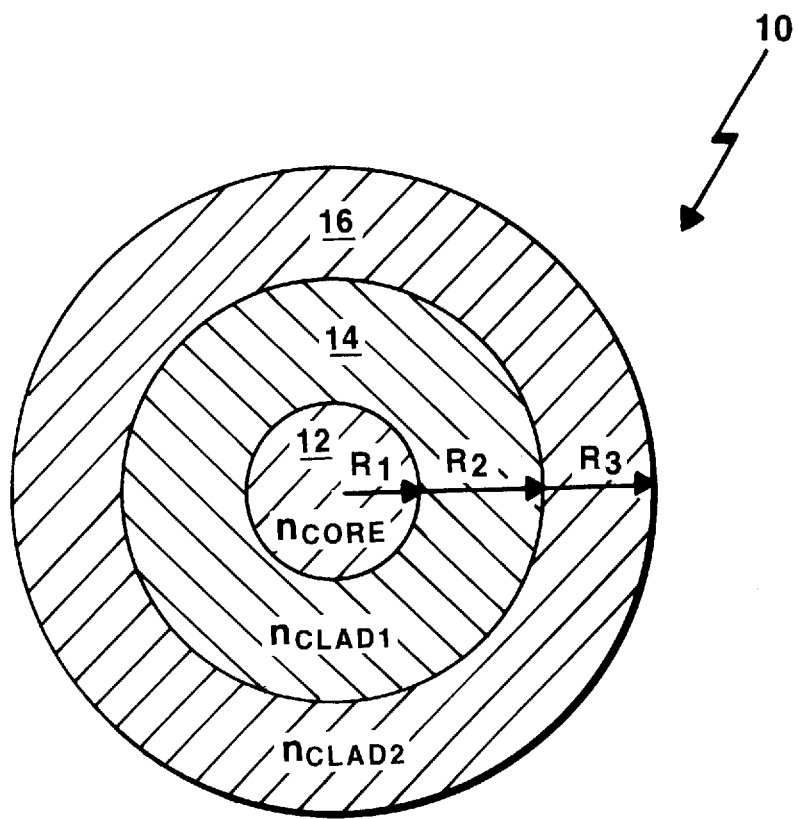
FIG. 1 is a cross-sectional view of an optical fiber constructed in accordance with the principles of the invention.

Referring now to FIG. 1, an optical fiber 10 includes an inner multi-core/cladding section, as shown, comprising a single-mode core 12 which, in this particular embodiment, is fabricated from silica glass having an index of refraction $\eta_{core}$ typically around of about 1.47 and a radius $R_1$ typically of around 2–5 μm and doped with appropriate rare earth ions. Such rare earth ions constitute the active element for a fiber laser or fiber amplifier. For example, core 12 may be doped with erbium (Er) ions (typically denoted $Er^{3+}$), in which case optical fiber 10 exhibits gain at a wavelength typically around 1.5 μm. Also, the core may be doped with neodymium (Nd) or ytterbium (Yb) or combinations of Er, Nd or Yb, such as, for example, Er:Yb or Nd:Yb.

The single inner mode core 12 is surrounded by a multi-mode cladding region 14 having a circularly shaped cross-section. Cladding region 14 encompasses the entire longitudinal extent of core 12. Cladding region 14 may be provided, for example, from undoped silica having an index of refraction less than the index of refraction of the single mode core 12. In one particular embodiment, for example, the index of refraction $\eta_{clad1}$ of cladding 14 may be about 1.44 and the outer radius $R_2$ of cladding 14 (layer thickness) is typically about 2–5 μm.

In turn, the first cladding layer 14 is surrounded by a second cladding layer 16. The second cladding layer is also provided having a circularly shaped cross-section and is formed from a suitable polymer, or from a conventional low-index glass. The index of refraction $\eta_{clad2}$ of the second cladding layer 16 is selected to be greater than the index of refraction $\eta_{clad1}$ of the first cladding layer 14. For example, in the case where the index of refraction $\eta_{core}$ of core 12 is 1.47 and the index of refraction $\eta_{clad1}$ of cladding layer 14 is 1.44, the index of refraction $\eta_{clad2}$ of cladding layer 16 may be about 1.45. In this particular embodiment, the outer radius $R_3$ (layer thickness) of the second cladding layer 16 is typically about 2–5 μm.

While not shown in FIG. 1, second cladding 16 is surrounded by a pump cladding that has a diameter of around 250 μm, for example, for receiving pump light from the input end of fiber 10 for pumping rare earth doped core 12. The diameter of the pump cladding is proportionally much greater than the diameter of the core/cladding section of fiber 10. For example, the diametrical extent of the core/cladding section of fiber 10 may be only about 4 μm to 10 μm compared to the 250 μm pump cladding. As known to those skilled in this art, the pump cladding may have a cross-sectional shape which differs from the core/cladding cross-section shape of fiber 10. For example, the cross-sectional shape of the pump cladding may be square, rectangular or elliptical. The pump cladding would also be surrounded by an outer light-confining, protective cladding.

It should be noted that the relative values, rather than the absolute values of the refractive index of each of the layers 12–18 are of particular importance. The particular refractive index of each of layers 12–18 may be selected based upon a variety of factors including, but not limited to, a selected lasing wavelength, cladding material, dopants, type of fiber and other factors. Likewise, the outer radius of each of the layers may be selected based upon a variety of factors including but not limited to a selected laser wavelength, material and dopants.

Figure 1A:
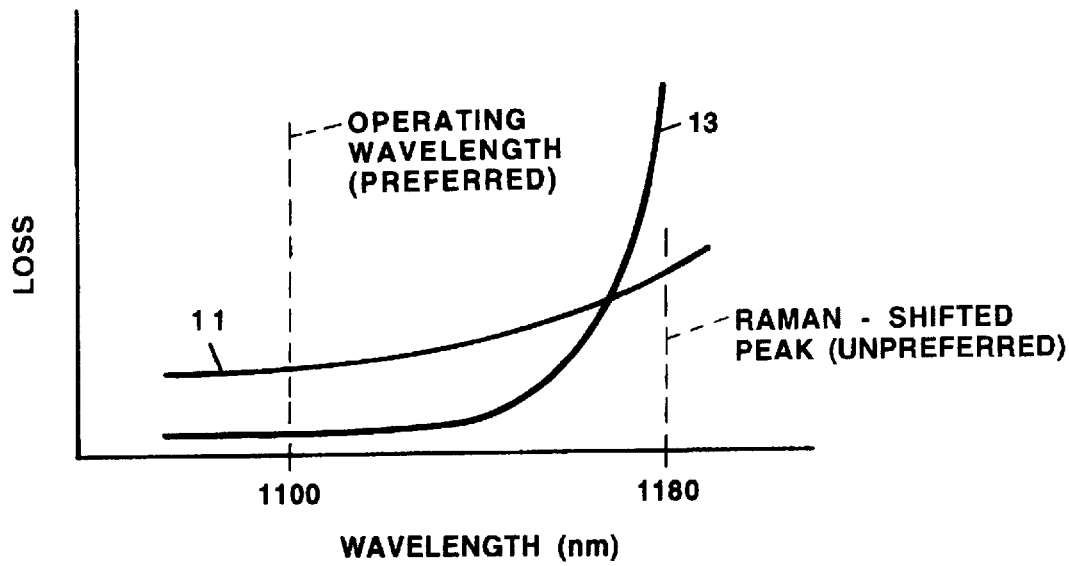
FIG. 1A is a graphic illustration of the loss characteristic versus wavelength with, and without, bending of the fiber.

This fiber produces a distributed loss at the undesired Raman-shifted frequencies. This loss can be enhanced by bending the fiber at an appropriate bend radius. Consequently, for the practice of this invention, the use of fibers highly sensitive to bending are preferred, such as W-fibers or QC fibers. FIG. 1 is an example of the W-fiber. QC fibers would also work, but W-fibers are more sensitive to bending than QC fibers and, consequently will provide a sharper edge cutoff for higher, unpreferred frequencies. These fibers are sensitive to bending and, with appropriate bending, may provide enhanced loss at higher wavelengths. As an example, if the wavelength of operation desired in a fiber laser has a peak at 1110 nm and the unpreferred higher wavelength caused by Raman scattering has a peak at about 1180 nm, then a relatively sharp cutoff for Raman-shifted higher wavelengths can be provided by constructing the fiber in accordance with FIG. 1 and bending the fiber. These modifications cause the Raman-shifted higher wavelength at 1180 nm to radiate out of the fiber. This is illustrated in FIG. 1A wherein it can be seen that the loss from fiber 10 increases with wavelength as illustrated by curve 11. This invention takes advantage of that loss through loss enhancement of Raman-shifted higher wavelength of 1180 nm by bending fiber 10 to provide a relatively sharp cutoff edge as illustrated by curve 13 in FIG. 1A.

Figure 1B:
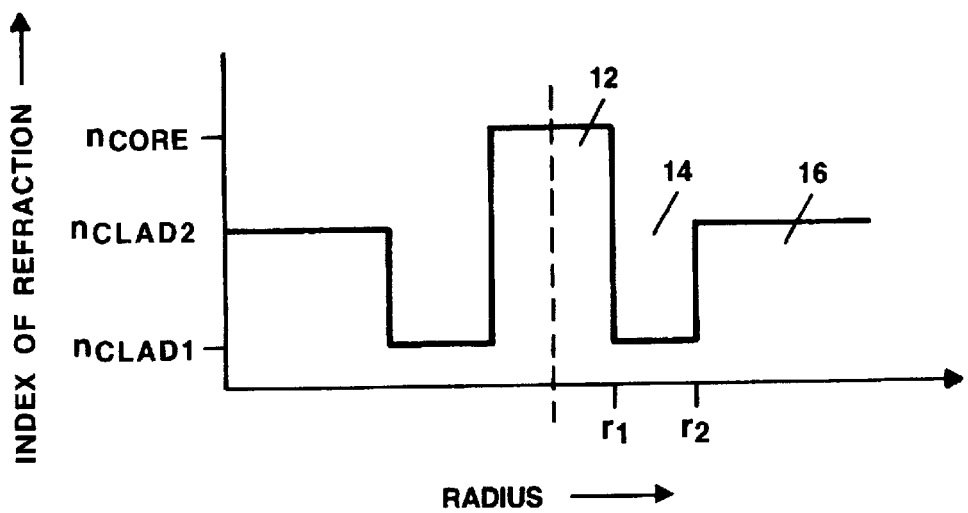
FIG. 1B is a plot of the index of refraction versus distance along a cross-sectional axis of the optical fiber shown in FIG. 1.

Referring now to FIG. 1B, a generalized plot of the cross-sectional index of refraction of the core/cladding section of optical fiber 10 constructed in accordance with the principles of the invention is shown. FIG. 1B is for illustrative purposes and the radii and the refractive index relationships illustrated are not necessarily drawn to relative scale. As shown in plot, the core 12 (FIG. 1) has an index of refraction which is higher than the index of refraction of cladding layers 14 and 16 (FIG. 1). The core 12 is surrounded by the first cladding layer with an index of $\eta_{clad1}$. The first cladding layer is, in turn, surrounded by the second cladding layer with an elevated index of refection, $\eta_{clad2}$. The radii $R_2$ and $R_3$ are selected so that this elevated area 16 is located within the evanescent coupling region of the core 12. By "evanescent coupling region", we mean the region of the fiber claddings in which a significant portion of the wings or the evanescent field of the propagating optical signal in fiber 10 that exists outside its core is found.

When a fiber is constructed with this profile, light with a Raman-shifted wavelength is radiated out of the core, but the desired lasing wavelength is transmitted in the core as indicated in FIG. 1A. This effect can be enhanced by bending at an appropriate bend radius which depends on the fiber parameters, materials and indices and is determined by applying an optical signal to the fiber and measuring both Raman-shifted wavelength and the desired lasing wavelength (or frequency) outputs. Then, the fiber is subjected to bending while monitoring these outputs to determine the best bend positioning where the Raman-shifted wavelength is minimal while the desired wavelength is optimal.

This fiber configuration results in optical fiber 10 having an insertion loss characteristic at the Raman wavelength which is greater than the insertion loss of conventional optical fibers at the Raman wavelength because the elevated index area effectively enhances the sharpness of the wavelength cutoff due to bending losses of optical fiber 10.

Furthermore, when the core 12 and cladding layers 14–18 are provided having indices of refraction with the relative relationships shown in FIG. 1A, the insertion loss characteristic presented by fiber 10 to signals propagating at the Raman wavelength is distributed along the length of the fiber 10. The distributed loss effectively raises the power threshold at which the stimulated Raman scattering occurs in the fiber 10. When such a fiber is used as a fiber laser, the power output at the lasing frequency can be much higher before Raman shifting occurs, resulting in higher power output at the lasing frequency.

Figure 2:
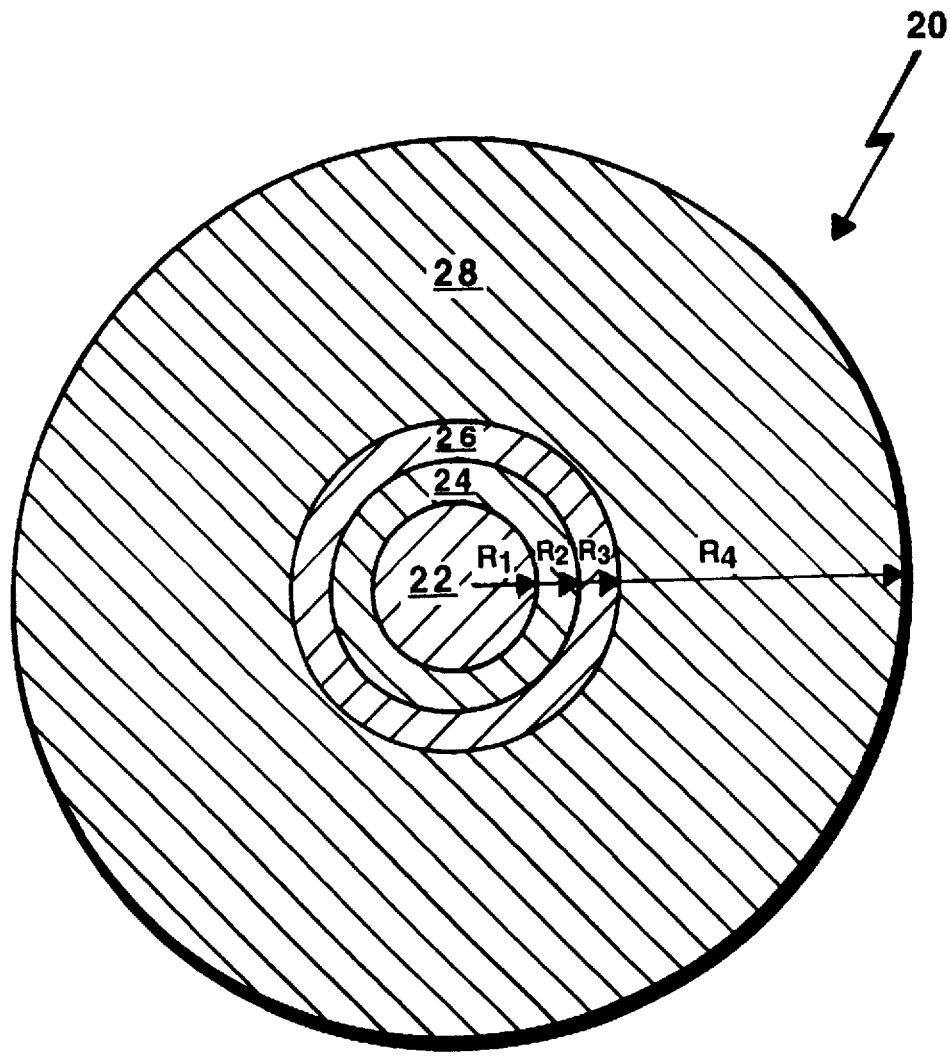
FIG. 2 is a cross-sectional view of an optical fiber having an absorptive ring.

FIG. 2 is a cross-sectional diagram of another embodiment of a fiber in which a frequency selective construction is used. Referring now to FIG. 2, an optical fiber 20 includes a core 22 provided, for example, from doped silica glass having an index of refraction typically of about 1.47 and having a diameter typically of about 2–5 μm and doped with appropriate rare earth ions. Such rare earth ions constitute the active elements in the optical fiber 20 and as such, dictate the lasing wavelengths at which gain is achieved in the case of a fiber laser.

A first cladding layer 24 disposed about core 22 encompasses the entire longitudinal extent of the core 22. The first cladding layer 24 may be provided, for example, from undoped silica having an index of refraction typically of about 1.45. In this particular embodiment, the cladding layer 24 is provided having a circular cross-section within a thickness typically of about 2–5 μm.

A second cladding layer 26 is disposed about the first cladding layer 24. Cladding layer 26 is provided having a circular cross-section and is provided having a thickness typically of about 2–5 μm. The second cladding layer is formed from a suitable polymer such as a fluoropolymer or from a conventional low index glass having an index of refraction typically of about 1.39. The second cladding layer is doped with a material having a relatively sharp absorption characteristic to signals having a wavelength corresponding to a Raman-shifted wavelength. Since the Raman-shifted wavelength is higher than the operating wavelength, it will have a larger Gaussian spot size and larger evanescent wings extending into claddings 24 and 26 compared to the operating wavelength propagating mode and, therefore, will be much more subject to the absorptive effects of cladding 26. The absorptive cladding is also constructed to have a low absorption to signals with the desired lasing wavelength. Absorptive cladding 26 may be illustratively fabricated from silica glass doped with rare earth or transition metal ions. Suitable doping materials include $Sm^{3+}$, $Ho^{3+}$, $Tm^{3+}$, $Pr^{3+}$ and $Dy^{3+}$.

Second absorptive cladding 26 is surrounded by pump cladding 28 which has a significantly larger diameter compared to the diameter of the core/cladding region 22-26, For example, pump cladding may have a 250 μm diameter. As known to those skilled in this art, pump cladding 28 may also have a different cross-sectional configuration from the core/cladding section of fiber 10, such as square, rectangular or elliptical. Pump cladding 28 would be surrounded by an outer light-confining, protective cladding.

By providing absorptive cladding 26 with a relatively high absorption characteristic at the Raman-shifted wavelength, fiber 20 presents a relatively high insertion loss characteristic to energy propagating along the length of the fiber at the Raman shifted wavelength while also presenting a relatively low insertion loss characteristic to energy propagating along the length of the fiber 20 at the desired lasing wavelength. This loss is also advantageously distributed over the length of the fiber.

Figure 3:
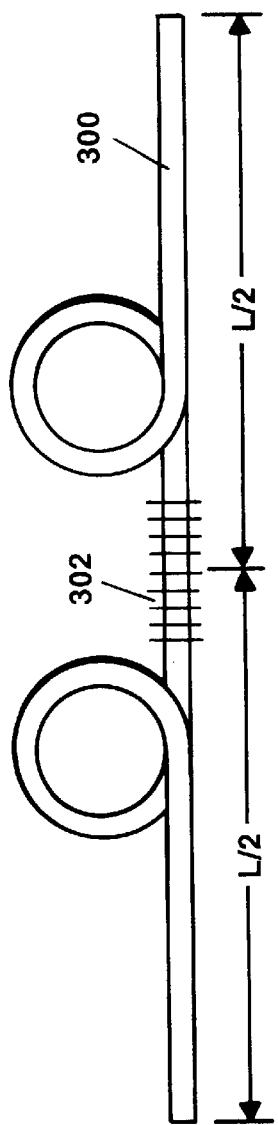
FIG. 3 is a schematic diagram of an optical fiber having a single long period grating.

In still another embodiment schematically illustrated in FIG. 3, an optical fiber of length L is constructed with a core with a long period grating 302 formed therein and located generally at the center of the fiber. The grating 302 is fabricated using conventional techniques with a periodicity selected to provide a relatively high insertion loss at the Raman frequency while simultaneously providing a relatively low insertion loss at the lasing frequency. The long period grating 302 acts as a discrete loss element to Raman wavelength signals propagating in the optical fiber. The grating 302 is generally tens to hundreds of times the lasing wavelength and causes the Raman-shifted wavelength to be directed out into the outer cladding. This approach has the advantage that it does not require a special fiber structure.

Figure 4:
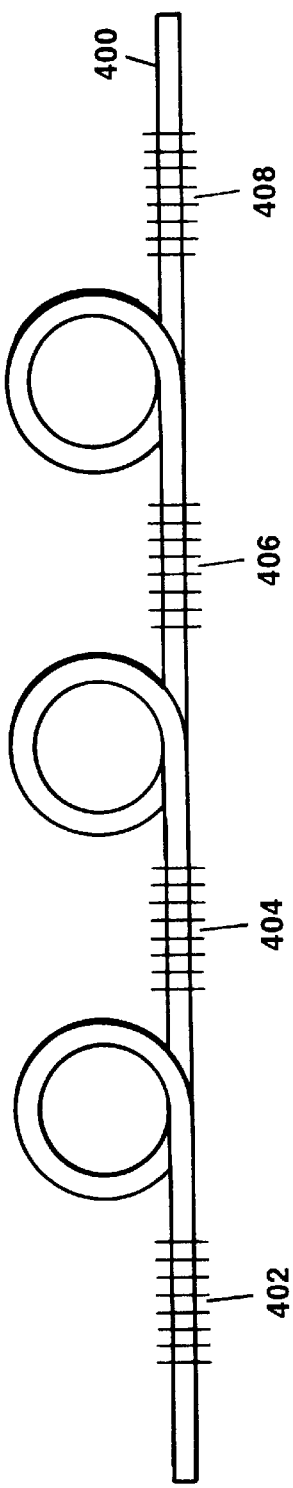
FIG. 4 is a schematic diagram of an optical fiber having a plurality of distributed long period gratings.

In some applications, it may be preferable to construct the fiber core with a region having a plurality of long period gratings, 402–408, formed along the fiber length as schematically illustrated in FIG. 4. Since the gratings 402–408 act as discrete loss elements, several gratings will have to be used along the fiber length, but this structure has the advantage that the loss is more distributed over the length of the fiber. In this manner, Raman-shifted is not allowed to build up before being directed out of the fiber. The efficiency of the fiber 400 is thus enhanced over the single gating structure illustrated in FIG. 3.

Figure 5:
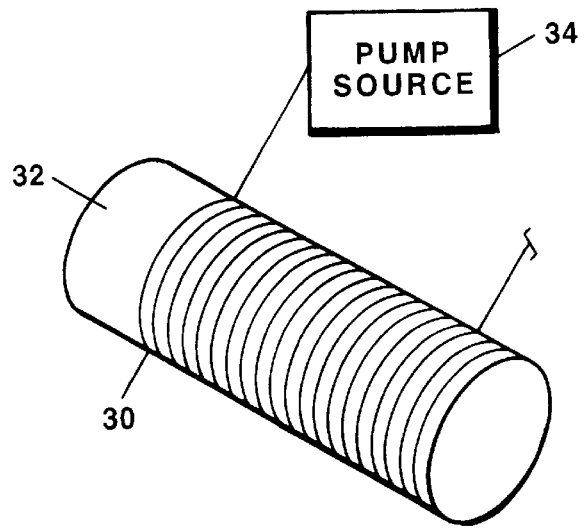
FIG. 5 is a diagrammatical view of a fiber laser system with bending loss introduced a particular wavelength to suppress ASE from a competing level system.

Referring now to FIG. 5, an neodymium (Nd) doped double clad fiber 30 is constructed to operate at a desired fundamental wavelength of 940 nm. As previously mentioned, one problem with operating the Nd doped fiber 30 at 940 nm wavelength is that Nd is a three-level system at 940 nm and the gain is much higher at a fundamental lasing wavelength of 1060 nm where Nd is a four-level system. Conventional operation at a wavelength of 940 nm thus requires a relatively high pump intensity.

Fiber 30 has a conventional construction comprised of a core, an inner cladding and at least one outer cladding. The core is single mode with a mode diameter of approximately 8–10 microns. The inner cladding size of the fiber is approximately 150 microns by 300 microns (rectangular) for conventional double clad fibers. Other geometries of the inner cladding and sizes are also possible and well-known. Smaller inner cladding sizes would be preferred for 940 nm operation, assuming the same pump power can be launched in the fiber. The smaller cladding size would result in a higher pump intensity, an improved population inversion and associated gain at 940 nm. Typical fiber length for a double clad fiber with 130 by 360 micron inner cladding is 50 meters to allow for a 90 percent absorption of the pump light.

In accordance with one aspect of the invention, the fiber 30 is coiled around a mandrel 32 having a diameter typically of about 8 millimeter (mm). For a typical 50 m length fiber there would be about 500–700 turns on the mandrel. A pump source 34 provides a pump signal to a first end of fiber 30 to operate the fiber 30 at a laser wavelength of 940 nm. Bending the fiber at the 8 mm diameter causes radiation of light at a wavelength of 1060 nm out of the fiber 30 while maintaining gain at a wavelength of 940 nm. By inhibiting the gain of the fiber 30 at a wavelength of 1060 nm, the occurrence of ASE at a wavelength of 1060 nm is prevented and the fiber 30 is operational at a wavelength of 940 nm. Due to the bend induced loss, the gain of the fiber at a wavelength of 1060 nm is inhibited continuously along the length of the fiber.

The wavelength at which the light is radiated out of the fiber increases with a bend radius of a fiber and depends on the mode diameter in a single mode core. By bending the Nd fiber with a bend radius typically of about 8 mm, the light at 1060 nm is radiated out of the fiber while maintaining gain at 940 nm. The particular bend radius which is used, however, depends upon a variety of factors, including, but not limited to, the type of fiber, its parameters and indicies, the desired lasing wavelength, etc.

Figure 5A:
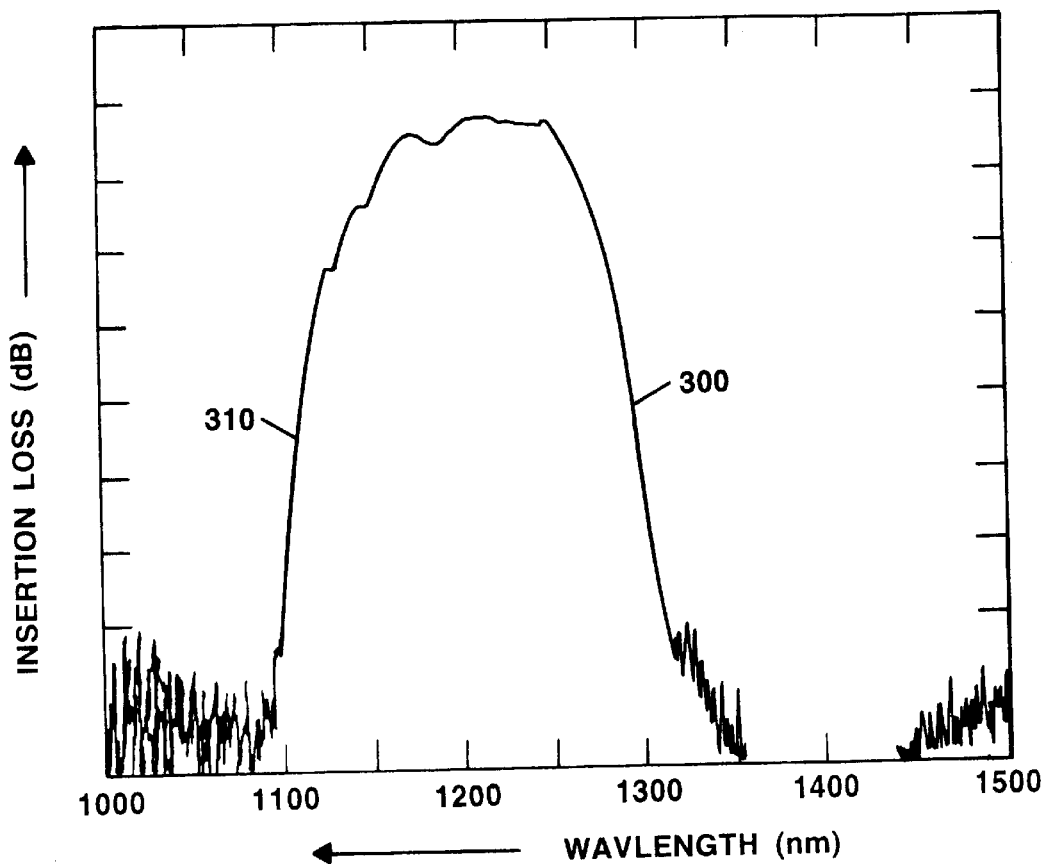
FIG. 5A is a graphic plot of insertion loss vs. wavelength.

FIG. 5A illustrates generally how the transmission through a fiber is affected by bending. Referring now to FIG. 5A, a typical plot of wavelength versus insertion loss generated by transmission of substantially white light through the core of a double clad fiber is shown. The measurement was made on a double clad fiber having a core doped with ytterbium (Yb) (specifically doped with ytterbium ions typically denoted as $Yb^{3+}$) and coiled around a mandrel having a diameter typically of about 28 mm. The plot gives the measured emission (vertical scale) for the output of the fiber a function of wavelength (horizontal scale). The horizontal scale runs from 1000 nm to 1500 nm, corresponding to 50 nm per division.

As illustrated in the graph, at relatively short wavelengths, for example, less than 1100 nm, the light is absorbed in the fiber core due to absorption by the Yb ions producing the edge 310 illustrated in FIG. 5. For wavelengths longer than 1250–1300 nm, the light is radiated out of the fiber due to bending induced loss, producing the edge 300 illustrated in the curve. The important part of the graph is the bending induced loss edge 300. By bending the fiber more strongly, this bend edge 300 can be shifted to shorter wavelengths. Notice that the loss changes relatively slowly with the wavelength—about 10 dB over about a 50 nm transition range.

A 50 nm wide transition region would be sufficient in the Nd doped system, mentioned above, to eliminate gain at 1060 nm without affecting the gain at 940 nm. Other conditions may require a sharper change in scatter loss vs. wavelength. For example, as mentioned above, Raman gain in fibers is about 50–70 nm. To suppress this gain, a sharper dependence on wavelength may be required. By designing a fiber with the index profiles discussed above in combination with bending, it is possible to increase the slope in this area in order to help eliminate the possibility of developing Raman gain. An increased slope would result in a better discrimination between two adjacent wavelengths which both experience gain in the fiber.

The embodiments of this invention are not limited to circular fibers, as the core and/or inner pump cladding may have other geometrical cross-sections as is known in the art, such as rectangular or elliptical cross-section contours. Also, the optical fibers may include polarization preserving structural features or be polarization insensitive.

Having described preferred embodiments of the invention, it will now become apparent to one of ordinary skill in the art that other embodiments incorporating their concepts may be used. Therefore, the inventive concepts are not limited to disclosed embodiments, but rather are limited only by the spirit and scope of the appended claims.

What is claimed is:

1. An optical fiber system having an active amplifying medium for propagating a first wavelength of light and concurrently producing and propagating at least one second wavelength of light which is desired to be eliminated, the fiber system comprising:

a single mode core having a first refractive index, the first and second wavelengths propagating in the core;

a first cladding surrounding the core for accepting pumping energy, the first cladding having a second refractive index lower than the first refractive index;

a second cladding surrounding the first cladding, the second cladding having a third refractive index significantly lower than the second refractive index so as to create a refractive index differential between the first and second claddings; and fiber bending means which bend the fiber with a sufficiently small bend radius that the second wavelength of light is radiated out of the core while the first wavelength of light is transmitted by the core, the refractive index differential between the first cladding and the second cladding preventing any substantial radiating of the pumping energy out of the first cladding.

2. An optical fiber system as recited in claim 1 wherein the first and second claddings having an index profile that includes an elevated index region located away from the core, but within an evanescent coupling region of the core.

3. An optical fiber system as recited in claim 1 wherein the single mode core is doped with rare earth ions.

4. A cladding pumped optical fiber gain medium comprising:

a single mode core having a first refractive index, the core propagating a first wavelength of light and for concurrently producing and propagating at least one second wavelength of light which is desired to be eliminated;

a pumping system for generating pumping energy that is absorbed by the doped core;

a first cladding surrounding the core for accepting pumping energy, the first cladding having a second refractive index lower than the first refractive index;

a second cladding surrounding the first cladding, the second cladding having a third refractive index significantly lower than the second refractive index so as to create a refractive index differential between the first and second claddings; and fiber bending means which bend the fiber with a sufficiently small bend radius that the second wavelength of light is radiated out of the core while the first wavelength of light is transmitted by the core, the refractive index differential between the first cladding and the second cladding preventing any substantial radiating of the pumping energy out of the first cladding.

5. An optical fiber laser as recited in claim 4 wherein the first and second claddings having an index profile that includes an elevated index region located away from the core, but within an evanescent coupling region of the core.

6. An optical fiber laser as recited in claim 4 wherein the single mode core is doped with rare earth ions.

7. A method for use in a cladding pumped optical fiber gain medium within which is propagated a first wavelength of light and at least one second wavelength of light which is undesired, the method comprising the steps of:

A. fabricating an optical fiber with a single mode core which has a first refractive index and within which the first and second wavelengths propagate, a first cladding surrounding the core which accepts pumping energy and has a second refractive index lower than the first refractive index, and a second cladding surrounding the first cladding which has a third refractive index significantly lower than the second refractive index so as to create a refractive index differential between the first and second claddings; and B. bending the optical fiber with a sufficiently small bend radius that the second wavelength of light is radiated out of the core while the first wavelength of light is transmitted by the core, the refractive index differential between the first cladding and the second cladding preventing any substantial radiating of the pumping energy out of the first cladding.

8. A method as recited in claim 7 wherein step A comprises the step of:

A1. fabricating the optical fiber so that the first and second claddings having an index profile that includes an elevated index region located away from the core, but within an evanescent coupling region of the core.

9. An optical fiber system for allowing preferential propagation of light of a preferred wavelength versus an unpreferred wavelength, comprising:

an optical fiber having a core for propagating said wavelengths;

a first cladding surrounding said core and having a refractive index lower than a refractive index of said core;

a second cladding surrounding said first cladding and having a refractive index significantly lower than the refractive index of said first cladding so as to create a refractive index differential between the first and second claddings;

a loss mechanism associated with said second cladding which attenuates the unpreferred wavelength, wherein said loss mechanism is a bending of said optical fiber to direct the unpreferred wavelength out of said core, the refractive index differential between the first cladding and the second cladding preventing any substantial radiating of the pumping energy out of the first cladding.

10. The optical fiber system of claim 7 wherein said optical fiber includes a pumping cladding.

11. An optical fiber system as recited in claim 1 wherein the active amplifying medium comprises a fiber amplifier.

12. An optical fiber system as recited in claim 1 wherein the active amplifying medium comprises a fiber laser.

13. An optical fiber amplifier system as recited in claim 1 further comprising at least one core cladding formed between the core and the first cladding and having a refractive index lower than both the core and the first cladding.

14. An optical fiber amplifier system as recited in claim 1 further comprising at least one set of first and second core claddings formed between the core and the first cladding, the first core cladding having a refractive index lower than both the core and the first cladding, and the second core cladding having a refractive index lower than the core but higher than the first cladding.

15. An optical fiber amplifier system as recited in claim 1 wherein the second wavelength of light results at least in part from Raman scattering.

16. An optical fiber amplifier system as recited in claim 1 wherein the second wavelength of light results at least in part from amplified spontaneous emission.

* * * * *

UNITED STATES PATENT AND TRADEMARK OFFICE
CERTIFICATE OF CORRECTION

PATENT NO.   : 5,892,615
DATED        : April 6, 1999
INVENTOR(S)  : Stephen G. Grubb, Raymond Zanoni, Robert G. Waarts and Jean-Luc Archambault It is certified that error appears in the above-identified patent and that said Letters Patent is hereby corrected as shown below:

Column 10, claim 10,
Line 13, should read
-- 10. The optical fiber system of claim 9 wherein said optical fiber includes a pumping cladding. --

Signed and Sealed this

Twenty-third Day of October, 2001

Attest:

NICHOLAS P. GODICI
Attesting Officer
Acting Director of the United States Patent and Trademark Office